March 14, 1961 M. MAUL 2,974,859
RECORD TAPE CONTROLLED PUNCHED CARD MACHINES
Filed May 1, 1957 6 Sheets-Sheet 1

*Inventor:*
Michael Maul

March 14, 1961          M. MAUL          2,974,859

RECORD TAPE CONTROLLED PUNCHED CARD MACHINES

Filed May 1, 1957          6 Sheets-Sheet 2

*Inventor:*
*Michael Maul*
By Michael S. Striker
agt.

March 14, 1961 M. MAUL 2,974,859
RECORD TAPE CONTROLLED PUNCHED CARD MACHINES
Filed May 1, 1957 6 Sheets-Sheet 4

*Inventor:*
Michael Maul

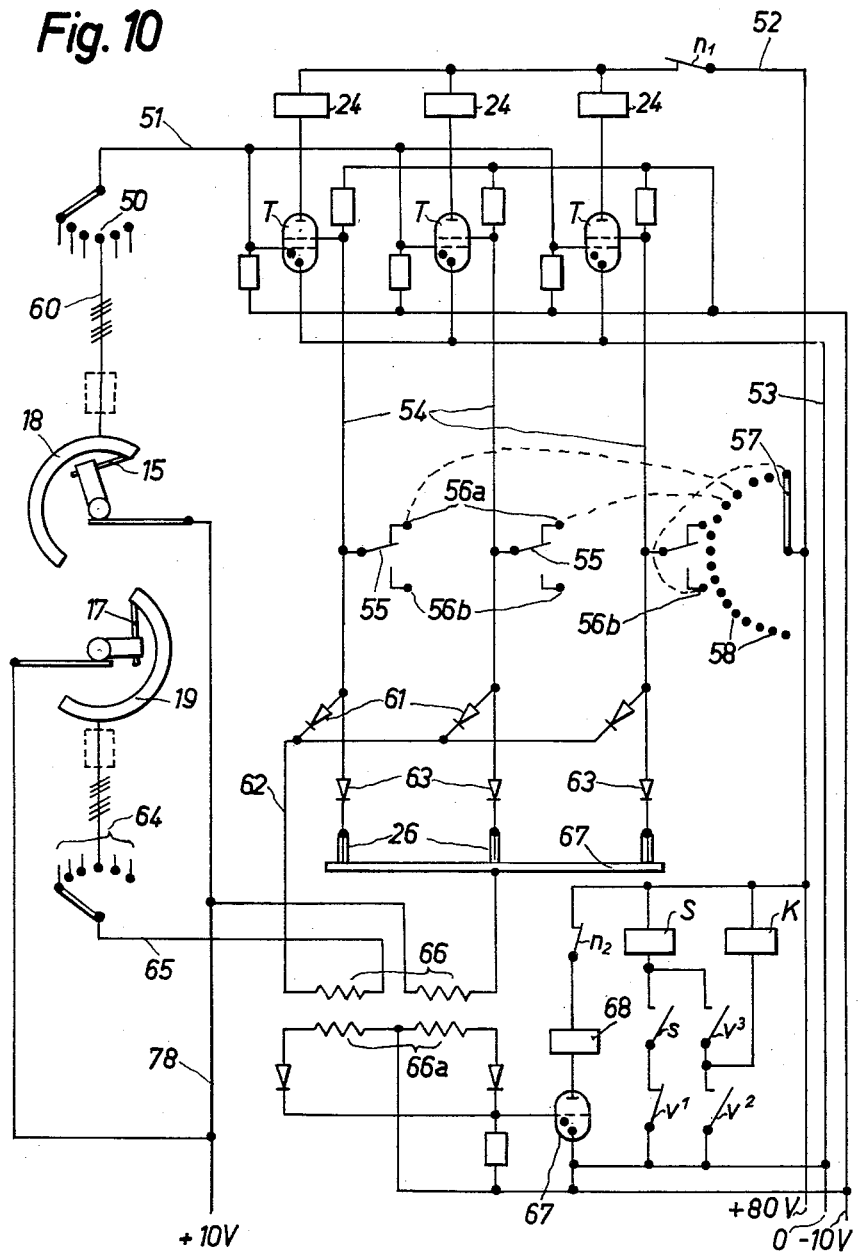

March 14, 1961  M. MAUL  2,974,859
RECORD TAPE CONTROLLED PUNCHED CARD MACHINES
Filed May 1, 1957  6 Sheets-Sheet 6
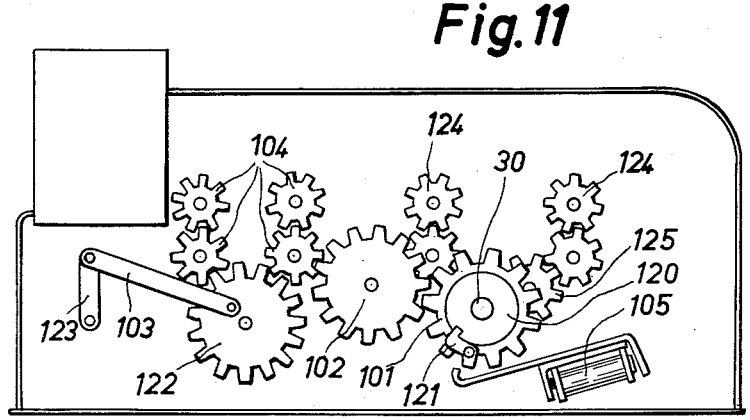
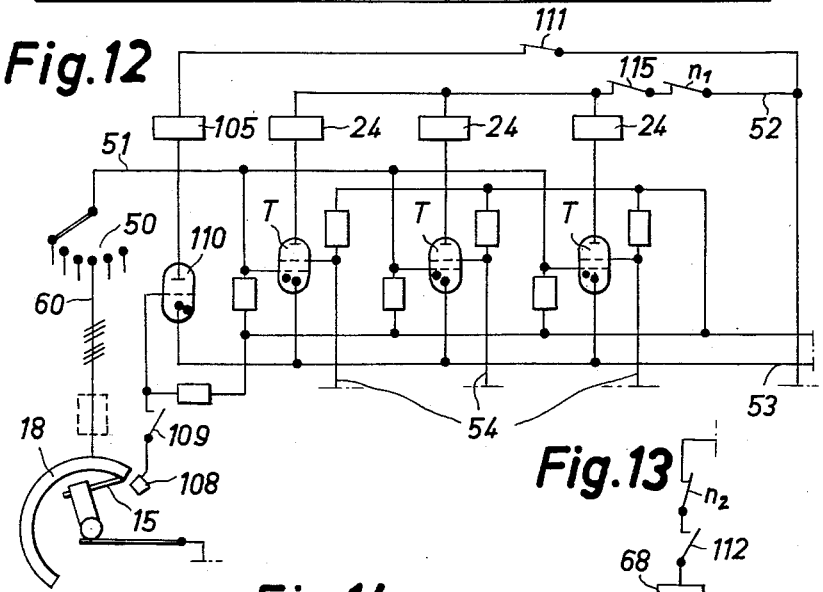
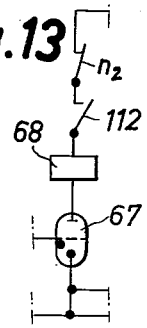
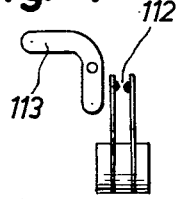
Inventor:
Michael Maul

United States Patent Office 2,974,859
Patented Mar. 14, 1961

2,974,859

RECORD TAPE CONTROLLED PUNCHED CARD MACHINES

Michael Maul, Hindenburgstrasse 60, Schwabach, near Nurnberg, Germany

Filed May 1, 1957, Ser. No. 656,294

Claims priority, application Germany June 1, 1956

6 Claims. (Cl. 234—34)

In the art of card punching machines the cards are generally punched by means of a key board in accordance with the original record. In most cases, the punched cards are subsequently verified by a manually actuated verifying machine. For some years, however, it has become customary in suitable cases to save the manual operation for the preparation of punched cards and to produce a record tape concurrently with the typing of the records on a typewriter or an auditing machine. The cards can then be punched automatically under the control of the tape.

Preparing the punched card from a section of the record tape is comparatively easy if the record tape is successively analyzed column by column and if synchronously therewith a punched card is also successively punched column by column. If the perforation-code of the record tape is different from that according to which the card is to be punched, only a single translator, common to all columns must be provided. Herein, it is most customary that the record tape is punched according to the international teletype code, while the card has to be punched according to the conventional single hole system, so that, for instance, each digit is presented by a single hole within ten hole positions of a column. The translator may, however, even be saved if, for instance, the card is to be punched according to the hole combination code employed for the record tape.

The aforesaid manner of operation, no matter whether the same code or a different code is used for the card, is very simple but the efficiency is low, since for instance, when employing the conventional cards, 80 columns must be fed one after the other past a row of punches. Moreover, this manner of operation is disadvantageous insofar as the column sequence on the card is bound to the column sequence on the record tape and the so-called interchanging between the columns is impossible at all, and the column on the punched card cannot appear in a different sequence than the perforation columns on the record tape.

It has already early been recognized (Swiss Patent 251,544, and French Patent 1,122,224) that an increase of the punching efficiency is only possible when applying another punching method. For reasons of simplicity this punching method is termed, contrarily to the columnary perforation, "linewise punching" or more exactly "hole position row by hole position row punching" or "hole position line by hole position line punching." In such punching machines a row of punches is provided comprising only a single punch for each perforation column, the individual hole positions of a column being successively fed past the associated punch. Thus, for instance the zero-line, then the 1-line and subsequently the 2-line etc. of a conventional card arrive below the punches. Therefore, for a card to be punched according to the so-called single hole system and in case only numerals must be punched, only 10 perforation steps are necessary instead of 80 perforation steps required for columnar perforation.

Equally well it has also early been recognized that this increase of efficiency may only be attained by a considerable increase of means in the machine, by which the columnar analysis of the record tape may be stored, the row of punches being then controlled by this store during the linewise feed of the card. This store may for instance be provided as a relay store or in any other way. In each instance, however, the technical means for storing will be considerable.

The necessary storing does not depend on whether a transfer takes place using the same or a different code. For the code-different transfer in one of the known devices only a single translator is required which during the columnary analysis of the record tape translates the data for each column, so that concurrently the translated result may be stored. However, also in this case a voluminous store is required.

Employing of a store in the known manner permits not only the linewise punching of the card, which means a higher efficiency of the machine, but also column interchangeability which in many cases is particularly desired.

According to the present invention an automatic card punching machine is provided in which the card, similar to the known devices, is fed hole position line by hole position line past a row of punches comprising a single punch per column and is punched as determined by the index marks of a record tape. The record tape may be a perforation tape but it may equally well be a magnetic tape or any other tape. In the conventional arrangement, the index mark columns of the tape are arranged perpendicular to the longitudinal direction of the tape and are successively analyzed column by column by an analyzing device. Each record tape section comprising a plurality of columns is transferred to a punched card in one machine cycle.

According to the instant invention the same result as in known devices, namely a high perforation efficiency due to the linewise perforation and the possibility of column interchangeability may be obtained without necessitating the provision of a voluminous storing device. While in the known devices the record tape section is fed only once past an analyzing device common to all columns, according to the invention the stationary tape section is successively analyzed column by column by the analyzing device before each punching of a hole position line of the card and during this analysis, the punches determined by the analyzing result are selected for punching. Consequently, the tape section is repeatedly analyzed in accordance with the number of hole position lines of a card, said lines being fed past the row of punches.

In the machine according to the invention verification of the punched card with respect to agreement with the associated tape section, may perferably also be effected. For this purpose two separate analyzers are provided for successive tape sections, one of which cooperates with the row of punches, while the other one cooperates with a row of analyzers for the line-wise verification of the card.

According to the invention transfer of the data may be effected in the same code as well as in a different code. In the code-different transfer, the translation is already effected during the columnary analysis of the record tape. Contrary to the known devices the translation is repeatedly effected, namely upon each analyzing cycle for the tape section.

Particularly advantageous arrangements are obtained by guiding the tape in a loop in the analyzing device and by a commutator which in a simple manner permits interchangeability of the columns.

In a simple manner, the invention permits even the preparation of cards having a plurality of perforation decks, as will be seen from the description.

An embodiment of the invention is illustrated in the accompanying drawings:

Fig. 10 is the wiring diagram of the machine.

Fig. 11 shows the rear view of the machine illustrated in Fig. 4, said machine being, however, modified with respect to its drive in the manner still to be described.

Fig. 12 shows the upper part of the wiring diagram according to Fig. 10 inclusive of the modifications according to the addition.

Fig. 13 shows a portion of the lower part of the wiring diagram according to Fig. 10 inclusive of the modification resulting from the addition.

Fig. 14 shows a detail.

Figure 1:
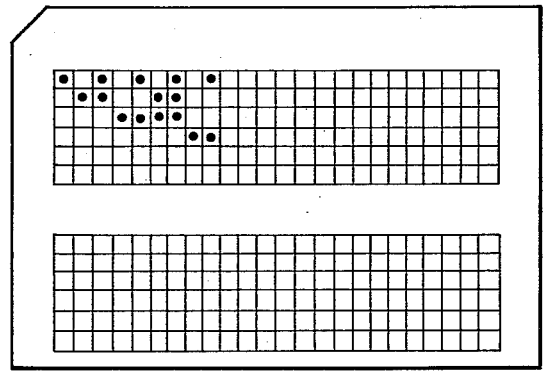
Fig. 1 shows a double-deck card comprising in each deck six rows of hole positions and twenty-four perforation columns per deck.

The punched card 10 illustrated in Fig. 1 comprises two decks each having 24 vertical perforation columns. Each perforation column includes six hole positions, and a horizontal row of hole positions is therefore termed row of hole positions in the meaning of the present specification. The punching mechanism contains accordingly a row of 24 punches arranged adjacently, which successively punch at first the six rows of hole positions of the first deck, punching of the second deck taking place in a corresponding manner thereafter.

Figure 2:
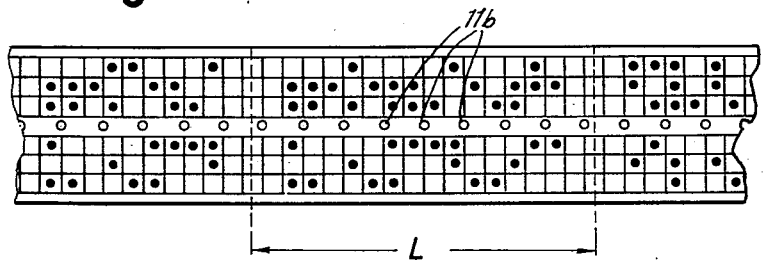
Fig. 2 shows a part of the perforated tape.

The perforated tape according to Fig. 2 comprises perforation columns arranged transversely of the longitudinal direction of the perforated tape. Each perforation column comprises also six hole positions. Between the upper and the lower three hole positions there are arranged feed holes 116 for the perforated tape which are engaged by the sprockets of a sprocket wheel. The section L arranged between the dash lines represents a section of the perforated tape. The various sections of the perforated tape are spaced a small unpunched distance from each other. Maximally the section of the perforated tape may contain as many perforation columns as the punched card, i.e. 48, however, in the case of Fig. 2 only a section comprising 14 perforation columns is illustrated. In any perforated tape, however, all sections have the same length.

Figure 3:
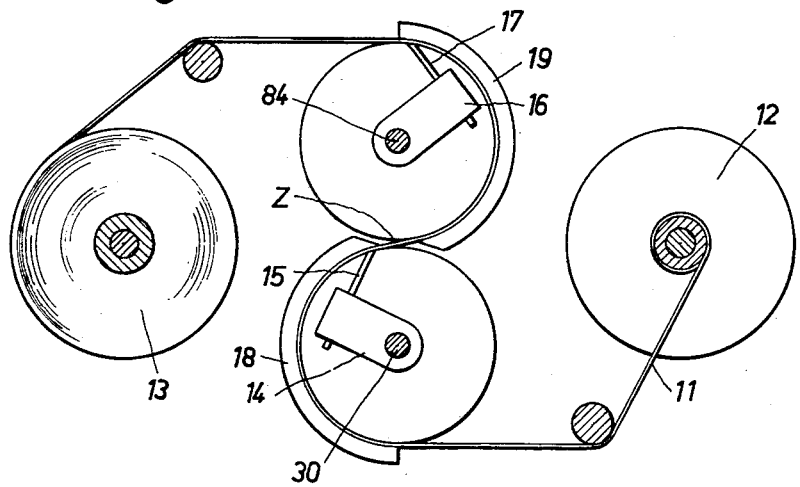
Fig. 3 shows diagrammatically the S-shaped loop feed of the perforated tape through two analyzing devices of which the lower one serves for punching and the upper one for verifying.

Fig. 3 shows diagrammatically a side view of the analyzing device for the perforated tape, the section for punching being analyzed in the lower analyzing station and the section for verifying being analyzed in the upper analyzing station. The perforated tape 11 is wound off drum 12, and guided through the lower analyzing device in form of a loop open to the right, and subsequently guided through the upper analyzing device where the loop is open to the left. Winding is effected on the drum 13. The analyzing arm 14 carries brushes 15 analyzing the lower loop of the perforated tape, and the arm 16 carries the brushes 17 serving for analysis of the upper loop of the perforated tape. While the perforated tape is stationary, the arms 14 and 16 continuously rotate in opposite directions. Thus, through the holes of the perforated tape, the brushes 15 may contact the contact pieces 18 and the brushes 17 may contact the contact pieces 19.

The length of the contact pieces 18 and 19 corresponds to the longest section of the perforated tape which may ever occur so that the brushes 15 or 17 may slide over 48 perforation columns of the perforated tape, this corresponding to one analyzing cycle. In this instance each brush starts analysis by analyzing the first column of the perforated tape since this column always leads in feeding direction of the tape. Analyzing of the 48 columns takes approximately half a rotation of the brush carrier arms 14, 16. During this analysis energization of the punch selector magnets takes places. During the second half of the rotation of the arms 14, 16 the actuation of the punches by means of the punching drive common to the whole row of punches and subsequently advancing of the card to the next row of hole positions and to the next deck, respectively, or upon card change to the first row of hole positions of the next card is effected.

Punching of the card according to the corresponding number of analyzing cycles of the perforated tape having been performed, simultaneously with the advance of the next card the perforated tape is advanced for one section so that now the next section of the perforated tape may be analyzed by the brushes 15 or 17, respectively.

The advance for the perforation tape may be adapted to the desired number of columns of the perforated tape in the manner still to be described. The position of the perforated tape must, however, be so determined that the limit line between two sections of the perforated tape is arranged in each instance at the contact point designated Z of the two analyzing devices. Therefore, if a section of the perforated tape comprises, for instance, only 14 hole columns, the lower loop of the perforated tape contains to the left, as viewed from Z, the columns 1 to 14, the column number 1 being arranged to the left of Z. The preceding section of the perforated tape used for verification also contains only 14 perforation columns, the column 14 ending to the right of Z. Since in each instance the analyzers 15 and 17 are to start the analysis simultaneously at the column number 1 (or also at the last column), in the present instance the arrangement is such that the arm carrying the brush 17 may be adjusted in clockwise direction for such a distance that the brush 17 analyzes the first column of the perforated tape, also if the brush 15 is located on the first column of the following section. Simultaneously with this adjustment is also effected, in the manner still to be described, the feed setting for the perforated tape to a feed corresponding to a section of the perforated tape having 14 columns.

Figure 4:
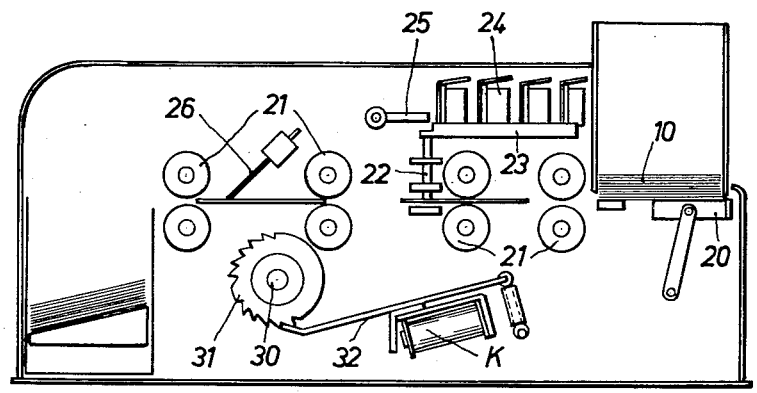
Fig. 4 shows diagrammatically a section through a card punch having a verifying device.
Figure 5:
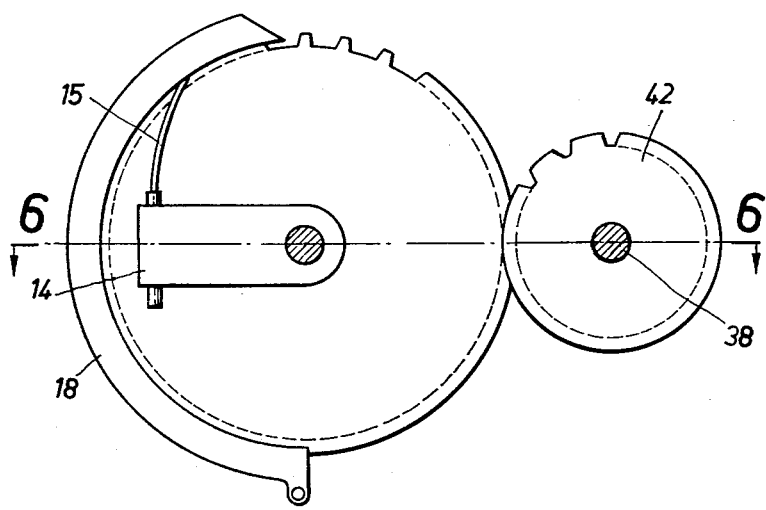
Fig. 5 shows at an enlarged scale a section through the lower analyzing device for the perforated tape.

Fig. 4 shows diagrammatically the punching device for the card. The cards 10 are inserted in a known manner into the magazine and advanced by a feed knife 20 therefrom. The feed knife 20 is in a known manner in gearing connection with the feed rollers 21. The card is advanced hole position by hole position through the controlling device still to be described past the row of punches 22. In a known manner each punch 22 is associated with a selector bar 23 which may be advanced to the left by a selector magnet for a distance to place it below the punching yoke 25.

When the section of the perforated tape is analyzed during one analyzing cycle, the selector magnets 24 are energized. At the end of the analyzing cycle the punching yoke 25 is pressed downwardly by a power drive and the selector bars 23 advanced to the left press their punches 22 through the card.

In the direction of the card feed, behind the row of punches 22, there is arranged a row of brushes always analyzing the identical row of hole positions being below the punches 22. These analyzing brushes analyze the card already punched and compare the latter with its associated section of the perforated tape being at the same time in the analyzing device 17, 19. In this manner, a verification of the card just punched with the original section of the perforated tape is effected directly after the perforation.

Feeding of the card takes place under the control of a clutch magnet K by a continuously rotating shaft 30. In a similar manner as will be described for the friction clutch shown in Fig. 7, the shaft 30 tends to drive the ratchet wheel 31 through friction disks, the ratchet wheel, however, being locked by the pawl 32 of the magnet K. To the ratchet wheel 31 is rigidly connected a gear arranged behind said ratchet wheel, from which gear the drive is transmitted through a gear train to the drive rollers 21 and the knife 20. When the magnet K is instantaneously energized, its pawl 32 releases the ratchet wheel 31 until engaging the next tooth, so that the distance of feed is correspondingly transferred to the card. The ratchet wheel comprises 2 x 6 teeth which correspond to the six hole positions of the two card decks. Between these two groups of teeth are arranged two larger sections which correspond to the distance between the two decks within the card or between the cards, respectively. Due to the instantaneous energization of the magnet K another card is advanced, is subsequently further fed six times position-by-position. The first row of positions of the next deck is advanced below the punches, subsequently the six rows of positions of this deck are fed past the punches step-by-step, and finally another card is supplied. Since the shaft 30 as well as the analyzers 15 and 17 rotate continuously, the time relations have been so chosen that the longest interval within the card feed, namely the time for a card change, may be effected during the half rotation of the brushes 15, 17.

Since all feed rollers 21 are connected among each other by gear means, the previously punched card is fed step-by-step past the verifying brushes 26, and therefore the verification may be effected exactly in agreement with the perforation, the verification taking place between the verifying brushes 26 and the analyzing device 17, 19. The cards are subsequently fed in a known manner to a card receiver.

Figure 6:
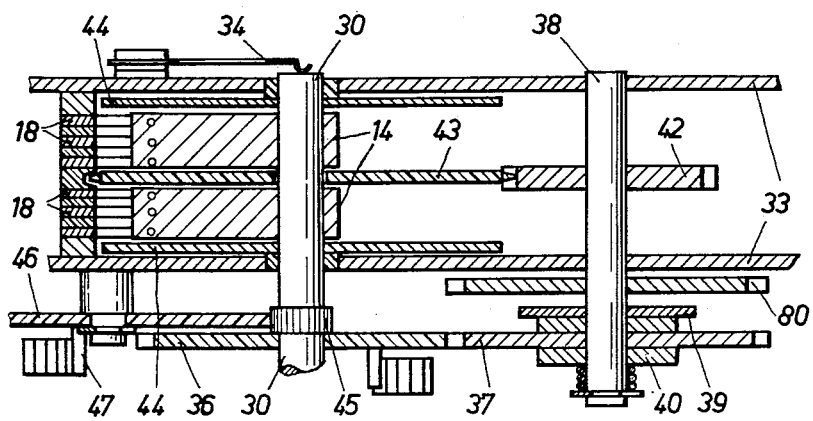
Fig. 6 shows a section through the analyzing device according to line 6—6 of Fig. 5.

The construction of the analyzing device for the control of the punching operation will be best seen in the section according to Fig. 6. The analyzing device is mounted between the two plates 33 between which the perforated tape is fed. In the plates 33 the shaft 30 is mounted in bearing sockets consisting of insulating material, since said shaft simultaneously serves as the common current supply line. Current supply is effected at the end of the shaft by the contact spring 34. On the shaft 30 are firmly mounted two metal brush carriers 14, each carrying three analyzing brushes 15. The analyzing brushes slide on the arched counter contacts 18, the latter being, however, insulated from each other. During each analyzing cycle the brushes 15 perform a complete revolution, however, only one brush at a time becomes electrically effective, since the contact arches 18 are successively inserted into the current circuit by a commutator in a manner still to be described. Therefore, upon each analyzing cycle the perforation columns of the perforated tape are consecutively analyzed, however, only a single row of hole positions of each column is rendered effective at any time.

Since, however, the data of the section (comprising maximally 48 columns) are to be transferred to two decks of the card each including 24 columns, the shaft 30 must perform two times six revolutions for each card, consequently, six revolutions for each deck, but must analyze all 48 columns during each revolution. During the first six revolutions the column selector commutator still to be described selects those columns from said 48 columns which are to be transferred to the first deck of the card and during the second six revolutions those columns are selected which are to be transferred to the second deck of the card.

On the rotating continuously shaft 30, a gear 36 is firmly mounted meshing with a gear 37. The latter is loosely arranged on a shaft 38 rotatably mounted in the plates 33. On the shaft 38 is firmly mounted the ratchet wheel 39. During the continuous rotation of the gear 37, the friction disks tend to drive the ratchet wheel 39 which is, however, arrested by the detent pawl 41. Accordingly, when the detent pawl engages the ratchet wheel 39, the shaft 38 is in rest position. When the pawl 41 is released, the friction disks may rotate the ratchet wheel 39 and therewith the shaft 38 during the release time, thus rotating also the drive gear 42 for the feed of the perforated tape. The latter gear 42 engages the sprocket wheel 43 the sprockets of which engage the feed holes 116 (Fig. 2) of the perforated tape thus advancing the latter. The middle part of the loop of the perforated tape is supported against the sprocket wheel 43 and is held at the margin by the supporting disks 44.

The feed of the perforated tape as well as the setting to different lengths of feed will now be described: As already mentioned above, the brushes 15 and 17 are to rotate once for each row of positions of the card to be punched. In the embodiment described, a card having two decks each comprising six hole positions is provided. Consequently, for punching of the card are required twelve revolutions of the brushes 15 and 17. The perforated tape is stationary during these twelve revolutions. After the twelfth revolution, concurrently with the card change, feeding of the next section of the perforated tape to the analyzing position is effected.

Figure 8:
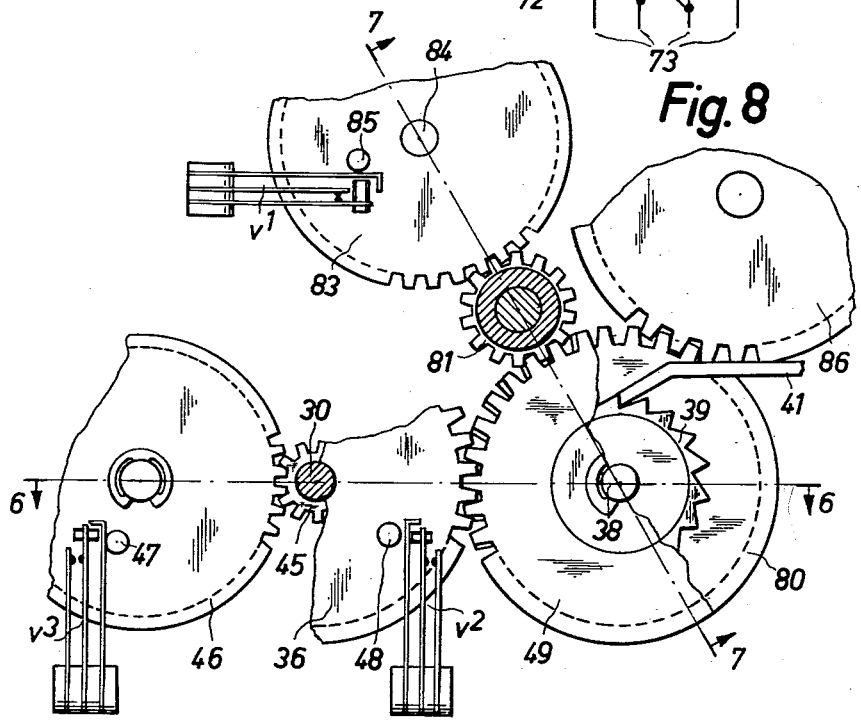
Fig. 8 illustrates diagrammatically the drive clutches as well as the transmission gears for the analysis of the perforated tape.

The control of the feed of the perforated tape is effected by the pawl 41 (Fig. 8). The latter is lifted by a magnet S (wiring diagram Fig. 10) controlled by the contacts $v^1$, $v^2$ and $v^3$. Depending on the responding time of the clutch magnet S, the friction clutch 38 remains effective for a shorter or longer period of time and therewith causes a longer or shorter feed of the perforated tape. The contact $v^3$ is closed by the pin arranged on the gear 46, namely in each instance instantaneously after a full revolution of the gear 46. The latter is driven by the pinion 45, the latter being firmly connected to the gear 36. As already described above, the gear 36 rotates at a uniform speed, and performs one revolution for each operating cycle. The ratio of 12:1 has been determined between the pinion 45 and the gear 46. Twelve analyzing cycles are required for this transmission, before the cam contact $v^3$ closes. The contact $v^3$ indicates by closing that a card has been completely punched and that a feed of the perforated tape is to take place. The contact $v^2$ is actuated by the pin 48 on the gear 36, immediately after each analyzing cycle.

As is seen from Fig. 10, the two contacts $v^2$ and $v^3$ are arranged in series and establish, corresponding to their closing times, a current circuit to the clutch magnet S at the end of each twelfth analyzing cycle thus causing responding of the latter magnet. The clutch magnet S establishes a holding circuit through its contact s and the cam contact $v^1$ and remains energized until the cam contact $v^1$ is instantaneously interrupted. Opening of the cam contact $v^1$ indicates the moment up to which the clutch magnet S remains energized and indirectly therewith also the length of the fed section of the perforated tape.

The cam contact $v^1$ is actuated by the pin 85 on the gear 83. The gear 83 is mounted on the shaft 84 carrying the analyzing arms 16 for verification. The drive of the gear 83 is effected from the rotating continuously gear 36 through the gears 49 and 81 serving as idle gears, so that the gear 83 rotates at the same speed as the gear 36.

Figure 7:
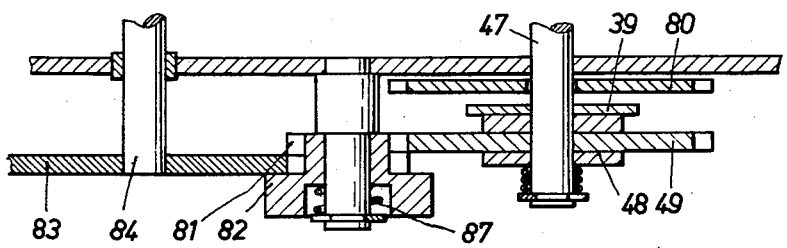
Fig. 7 is a section through the feeding device according to line 7—7 of Fig. 8.

The gear 81 is connected to a pull button 82 and is held by the spring 87 in a position causing gearing connection with the gears 49 and 83 (Fig. 7). Due to axial movement by means of the pull button 82, it is possible to disengage the gear 81 from the gear 49, the gearing connection with the gear 83 is, however, maintained. If, moreover, the button 82 is turned, the set of brushes for the verifying station is adjusted through the gear 83, without effecting at the same time setting of the set of brushes of the analyzing station for punching. Due to setting of the brushes of the analyzing station for verifying, the position of the cam actuating pin 85 is simultaneously changed, namely for exactly the same angular rotation as the set of brushes 16 since the gear 33 is in positive gearing connection with the brush arm 16. Corresponding to the change of position of the pin 85 the cam contact $v^1$ is opened at an earlier or later moment with respect to the cam contact $v^2$ thus extending or shortening the responding time of the clutch magnet S and advancing the perforated tape for a section of corresponding length.

The manner of operation of the device will now first be described for a punching operation, and in connection with the wiring diagram according to Fig. 10. In order to amplify the drawings, the upper analyzing device controls punching, and the analyzing device for verification is arranged below the same. Six lines are directed from the contact yokes 18 to a commutator 50 for connecting in each analyzing cycle one line after the other to the line 51. The lines leading from the contact yokes are only indicated by a single line 60 having six cross lines. Similar simplifications have been also made on other places of the wiring diagram.

The current supply to the brushes 15 is effected for instance from a positive voltage of $+10$ volts. Upon analysis of a row of hole positions of the section of the perforated tape, the corresponding punch selector magnets are to be energized. In order to simplify the drawing, in Fig. 10 only the punch selector magnets 24 for three punches have been indicated. Ahead of each selector magnet 24 is serially connected a double grid tube T. If positive potential is applied to both grids of a tube, the relay tube becomes conductive and current may flow from the line 52 at a potential of $+80$ volts through the associated selector magnet 24 to the line 53 being at the potential O. The relay tube being struck once, the selector magnet remains energized. The latter is only de-energized, when the cam contact $n_1$ opens after the punching operation is completed in order to release the selector magnets for the next setting.

The lower grid of each relay tube is connected to the line 51 which has the potential of $+10$ volts if the associated place of the perforated tape has a hole. The upper grid of each tube T is connected to the associated line 54. Each of these lines comprises a shift contact 55 connected in the upper position to the plugs 56a and in the lower position to the plugs 56b. Upon passage of the upper deck on the row of punches, the shift contacts 55 are in the upper position and upon passage of the lower deck on the row of punches said contacts are shifted downwardly. Shifting is automatically effected under cam control. The arm 57 of a commutator slides successively over the lamellas 58 associated with the 48 perforation columns of the tape section, however, in order to save space only every third lamella has been indicated in Fig. 10. Consequently, each lamella 58 corresponds to a certain hole column of the perforated tape. By means of plug connections indicated only by dash lines in Fig. 10, each lamella may be connected to one of the plugs 56a or 56b. In this manner any desired perforation column of the section of the perforated tape may be plugged to any desired column of the upper or of the lower deck.

Consequently, a certain relay tube T becomes only conductive if a certain column and a certain position of this column connects the lower grid to the positive potential of $+10$ volts and if concurrently therewith the identical column is selected by the commutator arm 57 and a positive potential of $+80$ volts is applied to the upper grid of the tube through the line 54. An example is given to illustrate this manner of operation. It be assumed that the first column of the tape section shall be transferred to the 48th column, i.e. to the last column of the lower deck of the card. In this instance the first lamella 58 is to be plugged to the last lower plug 56b. During the first six revolutions of the brush 15 the desired transfer does not take place since in this instance the contacts 55 are shifted to the upper deck and therefore the plug 56b is disconnected. When the lower deck is punched, the shift contacts 55 are, however, shifted downwardly. If, for instance, the first row of positions of the perforated tape is analyzed and if a hole is detected in the first column, positive potential is applied concurrently therewith to all lower grids of the relay tubes. Since, however, at the same time the contact arm 57 is on the first lamella 58 the latter being connected to the plug 56b which is now connected—during punching of the lower deck—by means of the contact 55 to the line 54, only the upper grid of the last tube is at positive potential and, consequently, of the whole row of relay tubes the lower grids of which are positive, only the two grids of the last tube will be positive so that the associated selector magnet 24 is energized.

The operations for verifying are performed in a similar manner as for punching, differing only in that now the verifying brushes 26 are provided in place of the punches. The lines 54 connected to the column selector 57, 58 through the deck shift contacts 55 branch in upward direction to the punching device and in downward direction to the analyzing brushes for the card, so that column selection is common to both devices and in each instance plugging of the column interchanging is to be effected only once. The lines 54 are connected to the common line 62 through the rectifiers 61, and on the other side to the verifying analyzers 26 through rectifiers 63. In this instance the rectifiers serve merely for avoiding return currents. The analysis of the perforated tape corresponding to the card already punched is effected in the described manner by means of brushes 17 performing the identical number of analyzing cycles as the brushes 15. Their contact yokes 19 as well as the contact yokes 18 are consecutively connected to the line 65 through a commutator 64. Said line 65 leads through the left hand winding of a differential transmitter 66 to the line 62. The right hand winding of the differential transmitter 66 is connected on the one hand to the contact bar 67 common to the brushes 26 and on the other hand to the feed line 78 which are at a potential of $+10$ volts. If a hole is detected in a hole position of a perforation column of the tape section, the left hand winding of the differential transmitter 66 becomes conductive since a current flows from the $+80$ volts line through the described column selector commutator through the selected line 54, the rectifier 61, through the left side of the differential transmitter, through 65, 64, 19, 17 to the line 78 of $+10$ volts. If punching of the card is correct, however, current may flow at the same time from the same line 54 through the brush 26, through the right side of the differential transmitter to the line 78 of $+10$ volts. In this instance the effects of the two windings compensate each other and a change of the machine operation is not effected. However, as soon as non-agreement is detected, only one of the two windings is energized and the energization is induced in the corresponding secondary winding 66a so that positive potential is applied to the grid of the tube 67 thus rendering this tube conductive. The verifying relay 68 responds and may indicate the error in a known manner, for instance by stopping the machine. Before resuming the verification, the contact $n_2$ opens in order to eliminate the verifying relay 68.

In the present description it has been assumed that the machine is always in operation. Naturally, switching in and switching off may be effected by a switch (not illustrated).

If transcoding of the data is to be effected in the manner aforesaid, one of the known transcoding devices may be used therefor. In this instance the number of inputs must agree with the number of rows of hole positions of the perforated tape and the number of outputs of the transcoded data must correspond to the number of rows of hole positions of the card. However, the number of analyzing cycles must always conform ot the number of rows of hole positions of the card, independent of the number of rows of hole positions of the perforated tape. In each instance one number of rows of hole positions may either be higher or lower than the other one.

Figure 9:
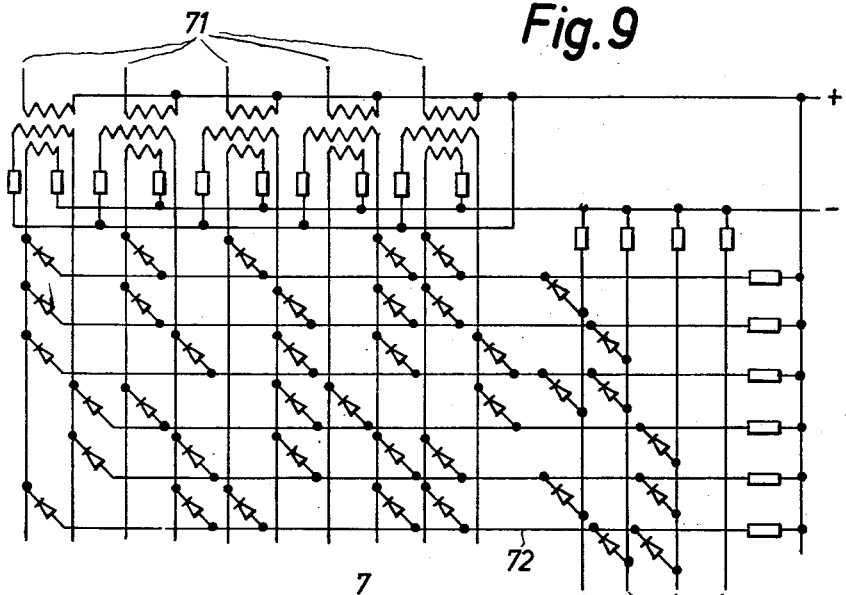
Fig. 9 shows a portion of a transcoder.

Fig. 9 shows a transcoder operating in a known manner with so called rectifier matrices. In this instance the principle is such that a hole combination is at first translated into a single value by a rectifying operation and that the respective single value is again translated by a rectifying operation into a combinational representation by another code. Fig. 9 shows the device for six inputs and for four outputs illustrating, however, only part of the whole arrangement since the latter is known per se. The arrangement according to Fig. 9 will be inserted on the punching side as well as on the verifying side at the places indicated in Fig. 10 by dash rectangles. The lines 71 originate from the six contact yokes 18 and 19, respectively. The latter lines form the inputs of the primary side of six transmitters, each of the latter comprising two secondary windings. The outputs of the latter have opposite potential, and when the primary winding is energized, potential reversing is effected on the outputs of the secondary windings. Depending on the energization of determined combinations of the transmitters 71, the voltage of only one line 72 is changed at a time. The distinct combinations of the lines 73 may subsequently be again connected through rectifiers to this line 72 corresponding to the single value. The lines 73 correspond to the lines connected to the commutator 50 or 64, respectively.

So far the main invention has been described. An additional device may also be provided permitting consideration of incorrect marks (for instance incorrect perforations) of the record tape.

In the practice it is unavoidable that sometimes a column in a tape section is erroneously punched due to actuation of a wrong key. Upon columnwise perforation of the tape a correction of the perforation is then no longer possible. It is therefore customary to provide a correction column in the tape section, mostly on one of the two ends of the section which column may be provided with a correction mark in case an erroneous perforation occurs in the tape section. Consequently, the correction perforation disqualifies the respective whole tape section, also if only a single column has been punched erroneously. In this instance the perforations must be repeated in the next tape section, however, without an erroneous perforation. Therefore, upon evaluation of the tape sections the sections provided with a correction mark may be disregarded by not punching a card for the respective section as is the case in the known devices.

The present additional device relates to a card punching machine according to the main invention being constructed in such a manner that a verifying station for the verifying comparison of the punched cards with their associated record tape sections is provided behind the punching station for the cards and in which machine a separate analyzing device for the tape sections is provided for the control of the punch selector magnets as well as for the verifying comparison.

In accordance with the present further development of this device according to the main invention, a correction column of the tape section is analyzed in the analyzing device for the record tape section controlling the punch selector magnets. Upon detection of a correction mark in this correction column, the feed and the perforation of an associated card in the punching station is interrupted though an analyzing cycle for the analysis of the section of the perforated tape takes place. Consequently, a gap is established in the card sequence between punching station and analyzing station for verification of the card. A device (for instance a so called card lever) responding upon the presence of a card is provided in the analyzing station for verification of the cards, said device rendering uneffective the comparing device for the respective operating cycle if a gap is detected in the card sequence, while analysis of the section of the perforated tape is effected in the analyzing station serving for verification of the section of the perforated tape.

Due to this provision it is attained that the incorrect section of the record tape is considered by non-perforation of a card and that due to the gap in the card sequence the comparing device may automatically disregard the incorrect section in a simple manner. Nevertheless the succession of incorrect and correct sections is considered in the two analyzing stations for the record tape. This is necessary since an incorrect section may be in the verifying station for the tape section while at the same time a subsequent correct section is in the analyzing station for the control of the punch selector magnets or since a correct section may be analyzed in the comparing station while an incorrect section is in the analyzing station for the control of the punch selector magnets.

The correction mark may be provided as a single hole in an exactly determined hole position or by a hole combination. The correction mark may either be provided at the beginning or at the end of the tape section. In the device described hereinafter based upon the main invention the correction column may, however, also be provided at a predetermined place in the midst of the tape section since anyhow all columns are analyzed before punching of the card is effected at all. Preferably, the correction column is provided at the end of a tape section. The foremost analysis of the correction column—disregarding the fact whether it is provided at the beginning or at the end of the tape section—is obtainable in the following ways:

If a tape section is punched and if during punching is detected that an erroneous perforation has been effected, the correction mark may be provided in the last column of the tape section. If the tape is wound in the usual manner, the correction column is always the last column of a section. Consequently, if the perforated tape is again unwound from the outside to the inside, the end with the last column, namely the correction column leads. Therefore, the correction column is fed as the first column to the analyzing device for the machine according to the main invention.

Many machines from which perforated tapes may be obtained, operate, however, also in such a manner that for the purpose of a correction perforation the section of the perforated tape is fed back so that the correction perforation may be effected in the first column of the tape section. A wound tape, in which the correction perforation is provided in the last mentioned manner is generally unwound from the inside so that upon feeding of the tape to the card punching machine the correction column may also lead.

An embodiment of the additional device is illustrated in Figs. 11 to 14. The latter indicate diagrammatically in which way the arrangement according to Figs. 1 to 10 is to be modified in order to obtain the modified manner of operation. For the same parts as in Figs. 1 to 10 the same reference characters have been used in Figs. 11 to 14. Reference characters differing from the characters applied in Figs. 1 to 10 are indicated by numbers over 100.

In the main invention (Fig. 4) a common drive is provided for the card feed knife 20 and the feed rollers 21, which drive may be derived from the shaft 30 and may be rendered operative by energization of the magnet K. In the modified arrangement, the magnet K controls directly only the drive for the pair of feed rollers arranged in front of and behind the row of analyzers 26. The drive for the knife 20 and for the feed rollers arranged between the latter and the punches 22 is interrupted by a one-revolution-clutch. This one-revolution-clutch consists of a clutch disk 120 firmly connected to the shaft 30 which is driven step-by-step. The pawl 121 mounted on the gear 101 may engage the clutch disk 120 so that the disk 120 takes the gear 101 with it. Through the idle gear 102, the gear 101 drives the gears 104 of the first two pairs of rollers as well as the gear 122 from which latter is driven the card knife through the link 103 and the rocker 123. One revolution of the one-revolution-clutch 120, 121 corresponds to the feed of a card or to the advance for one card division, respectively. The clutching and de-clutching, respectively, is effected by the magnet 105. If the latter is deenergized, clutching is effected, and upon energization the pawl 121 is held in released position. The last two pairs of rollers are driven directly by the shaft 30 through the gears 124 and 125. Due to responding of the clutch magnet 105 the card feed below the punches is stopped so that a gap is established in the card sequence between the punches 22 and the row of analyzers 26 serving for the verifying comparison.

According to the description of the main invention, the first hole position of the card is already below the punches when the first perforation column of the tape section is analyzed by the analyzers 15 (Fig. 3). As mentioned above, the correction column is, however, analyzed shortly before that. If a correction perforation is detected in the latter, the clutch magnet 105 is energized and the card feed is interrupted. Concurrently therewith the influence of the analyzers for the section of the perforated tape upon the punch selector magnets is interrupted.

Fig. 12 shows the necessary modifications made with respect to Fig. 10 of the main patent. A lamella 108 has been provided in the analyzing station for the tape section controlling the card perforation, said lamella being so arranged that it detects the perforation of the correction column. This perforation may be a single mark or a combination. A translation of the hole combination is, however, not required if the lamella 108 is below a position in which the correction combination shows a hole. The lamella 108 is connected through a contact 109 to the grid of a relay tube 110. The contact 109 is controlled by a cam not illustrated and closes at the moment at which the brushes 15 pass the lamella 108. If a correction hole is present, the tube 110 is ignited and an anode current flows through the magnets 105 and the contact 111 to the line 52. The contact 111 is controlled by a cam, not illustrated, and instantaneously opened at the end of the operating cycle in order to interrupt again the anode current flowing through the ignition tube 110. Upon energization, the clutch magnet 105 opens the contact 115 and interrupts the current circuit to the punch selector magnets 24. This opening takes place before analysis of the record columns of the tape. If current cannot flow through the punch selector magnets 24, the analysis of the section of the record tape is of no influence on the setting of the punches.

Fig. 13 shows the modification necessary for the verifying comparison. According to this modification, the contact 112, which closes upon card passage through the analyzing station is provided between the contact $n_2$ and the magnet 68. The contact 112 may be closed in a known manner by a card lever 113 (not illustrated, Fig. 14) arranged in the analyzing station consisting of the brushes 26. If the card is in this station, the contact 112 is closed by the lever 113. When the indicated card gap passes the analyzing station 26, the contact 112 is free to open. The controlling impulses emitted by the comparing device have no effect on the magnet 68 and locking is not caused.

If an incorrect section is detected in the tape analyzing station for punching (analyzing brushes 15, Fig. 3), no card is punched and a gap is established in the card sequence. Upon advance of the next tape section, the incorrect section arrives at the analyzing station comprising the brushes 17. Since at this time the gap in the card sequence passes the comparing brushes 26 (Fig. 4) the comparison is not effected. While the incorrect section is analyzed in the upper analyzing station according to Fig. 3, in the lower portion a correct section may be analyzed by the brushes 15. If the section is correct, the magnet 105 is energized and the feed of the card, which was stopped in the preceding cycle below the punches concurrently with the analysis, is continued, and this card is punched in accordance with the correct section analyzed by the brushes 15.

I claim:
1. In a record tape controlled machine, in combination, first feeding means for transporting a record tape composed of longitudinal tape sections having control marks arranged in columns extending transverse to the length of the tape so that the control marks form rows along the length of each tape section, said first feeding means feeding said tape in steps corresponding to the length of one tape section along an S-shaped path comprising two curved portions; second feeding means for feeding in column direction record cards having longitudinal columns and transverse rows of index-mark positions respectively corresponding to said columns and rows of control marks of said sections of said record tape; at least one row of punch means for punching the cards fed by said second feeding means and extending transverse to the feeding direction for successively punching said transverse rows of index-mark positions, each punch means being associated with one of said columns of said fed cards so that all columns of a fed card simultaneously pass said row of punch means index-mark position by index-mark position; at least one row of verifying analyzing means located behind said row of punch means for analyzing cards fed by said second feeding means, said row of verifying analyzing means extending transverse to the feeding direction for successively analyzing holes punched by said punch means, each verifying analyzing means being associated with one of said columns of fed cards, said verifying analyzing means including rotary brush means moving along one of said portions of said path of said tape; analyzer means for analyzing control marks in said tape and being movable in longitudinal direction of said tape, said analyzer means including rotary brush means moving along the other portion of the said path of said tape; first means for actuating said analyzer means and said punch means to move said analyzer means to effect successive analysis of the control marks of a row of control marks in an analyzing cycle synchronously with the successive actuation of said punch means of said row of punch means, and also synchronously with the successive actuation of said verifying analyzing means so that said analyzer means, verifying analyzing means and punch means are simultaneously rendered effective in corresponding columns of said tape sections and said cards, said brush means of said verifying analyzing means and of said analyzer means rotate in opposite directions synchronously with the actuation of said punch means; second means for actuating said analyzer means and said second feeding means to effect successive analyzing cycles for successively analyzing said rows of control marks of a tape section synchronously with the successive presentation of said rows of index-mark position to said rows of punch means and verifying analyzing means, said second means including means controlling said first feeding means to effect advancing of said tape for one tape section after a selected number of analyzing cycles has been completed and for holding said tape stationary until completion of said analyzing cycles in the respective tape section; and comparing means for comparing the result of the analysis of said verifying analyzing means with the results of the analysis of said analyzer means.

2. A machine as set forth in claim 1, and including means for setting said verifying analyzing means and said analyzer means to adjusted positions in such a manner that in the initial position of said verifying analyzing means and said analyzer means identical columns of two tape sections are analyzed.

3. A machine as set forth in claim 2, wherein said punch means include selector magnets and punches; and including means for connecting selected verifying analyzing means to selector magnets.

4. In a record tape controlled machine, means operating upon record cards under the control of said record tape, a tape section being associated to each record card and wherein tape sections and associated record cards are automatically fed one by one through the machine, tape and card having characters represented by index marks thereon, each character being represented in a record column comprising a plurality of index mark positions, analyzer means for the tape section, means operating upon the card and cooperating with said analyzer means, means for feeding the card in longitudinal direction of the record columns past a row of said operating means arranged transverse of the feeding direction and having an operating means for each perforation column, said operating means of a column being common to all hole positions of the column so that the card is passing the row of operating means with all record columns simultaneously but hole position row by hole position row, means for analyzing the record tape section repeatedly in longitudinal direction of the tape in successive analyzing cycles while the record tape section is kept stationary, the record tape containing the record columns perpendicular to the longitudinal direction of the record tape so that the rows of like index mark positions for adjacent record columns are arranged in said section in longitudinal direction of the record tape and that accordingly a column by column analysis is effected in each analyzing cycle, the index mark positions of at least one row of index mark positions being analyzed one by one, a separate analyzing cycle for the record tape section being effected for each row of hole positions of the card and synchronously with the successive presentation of the rows of hole positions of the card at the operating means, and means for controlling in each analyzing cycle always through the same record columns of the tape section the operating means for the same record columns of the card through the analyzing device for the record tape.

5. In a record tape controlled machine, means operating upon record cards under the control of said record tape, a tape section being associated to each record card and wherein tape sections and associated record cards are automatically fed one by one through the machine, tape and card having characters represented by index marks thereon, each character being represented in a record column comprising a plurality of index mark positions, analyzer means for the tape section, means operating upon the card and cooperating with said analyzer means, means for feeding the card in longitudinal direction of the record columns past a row of said operating means arranged transverse of the feeding direction and having an operating means including a single punch and an associated selector magnet for each perforation column, said operating means of a column being common to all hole positions of the column so that the card is passing the row of operating means with all record columns simultaneously but hole position row by hole position row, means for analyzing the record tape section repeatedly in longitudinal direction of the tape in successive analyzing cycles while the record tape section is kept stationary, the record tape containing the record columns perpendicular to the longitudinal direction of the record tape so that the rows of like index mark positions for adjacent record columns are arranged in said section in longitudinal direction of the record tape and that accordingly a column by column analysis is effected in each analyzing cycle, the index mark positions of at least one row of index mark positions being analyzed one by one, a separate analyzing cycle for the record tape section being effected for each row of hole positions of the card and synchronously with the successive presentation of the rows of hole positions of the card at the operating means, and means for controlling in each analyzing cycle always through the same record columns of the tape section the operating means for the same record columns of the card through the analyzing device for the record tape.

6. In a record tape controlled machine, means operating upon record cards under the control of said record tape, a tape section being associated to each record card and wherein tape sections and associated record cards are automatically fed one by one through the machine, tape and card having characters represented by index marks thereon, each character being represented in a record column comprising a plurality of index mark positions, analyzer means for the tape section, means operating upon the card and cooperating with said analyzer means, means for feeding the card in longitudinal direction of the record columns past a row of said operating means arranged transverse of the feeding direction and having an operating means including a single punch and an associated selector magnet, and a verifier analyzer for each perforation column, said operating means of a column being common to all hole positions of the column so that the card is passing the row of operating means with all record columns simultaneously but hole position row by hole position row, means for analyzing the record tape section repeatedly in longitudinal direction of the tape in successive analyzing cycles while the record tape section is kept stationary, the record tape containing the record columns perpendicular to the longitudinal direction of the record tape so that the rows of like index mark positions for adjacent record columns are arranged in said section in longitudinal direction of the record tape and that accordingly a column by column analysis is effected in each analyzing cycle, the index mark positions of at least one row of index positions being analyzed one by one, a separate analyzing cycle for the record tape section being effected for each row of hole positions of the card and synchronously with the successive presentation of the rows of hole positions of the card at the operating means, and means for controlling in each analyzing cycle always through the same record columns of the tape section the operating means for the same record columns of the card through the analyzing device for the record tape.

References Cited in the file of this patent

UNITED STATES PATENTS

| | | |
|---|---|---|
| 2,053,067 | Cunningham | Sept. 1, 1936 |
| 2,711,794 | Ghertman | June 28, 1955 |
| 2,876,650 | Sangster | Mar. 10, 1959 |